US007000724B2

(12) United States Patent
Lamela et al.

(10) Patent No.: US 7,000,724 B2
(45) Date of Patent: Feb. 21, 2006

(54) SKID STEER VEHICLE WITH BOGIE SUSPENSION

(75) Inventors: Anthony J. Lamela, Gilberts, IL (US); Brian E. Felsing, Park Ridge, IL (US); Troy D. Bateman, Plainfield, IL (US)

(73) Assignee: CNH America LLC, New Holland, PA (US)

(*) Notice: Subject to any disclaimer, the term of this patent is extended or adjusted under 35 U.S.C. 154(b) by 294 days.

(21) Appl. No.: 10/650,379

(22) Filed: Aug. 28, 2003

(65) Prior Publication Data

US 2005/0045390 A1 Mar. 3, 2005

(51) Int. Cl.
*B62D 11/04* (2006.01)

(52) U.S. Cl. .................... 180/242; 180/6.48; 180/358; 180/24.05; 280/124.111

(58) Field of Classification Search ............... 180/233, 180/242, 245, 246, 6.2, 6.48, 305, 308, 348, 180/357, 358, 24.05, 24.11; 280/124.11, 280/124.111, 124.114
See application file for complete search history.

(56) References Cited

U.S. PATENT DOCUMENTS

| | | | | |
|---|---|---|---|---|
| 3,786,888 | A * | 1/1974 | Nelson | 180/24.11 |
| 3,915,252 | A * | 10/1975 | Datta et al. | 180/246 |
| 4,535,860 | A * | 8/1985 | Waggoner | 180/24.05 |
| 4,837,694 | A * | 6/1989 | Narita et al. | 701/70 |
| 4,962,821 | A * | 10/1990 | Kim | 180/6.48 |
| 5,290,201 | A * | 3/1994 | Tesker | 460/116 |
| 6,179,075 | B1 * | 1/2001 | Figura et al. | 180/24.11 |
| 6,601,665 | B1 | 8/2003 | Hurlburt | |

* cited by examiner

*Primary Examiner*—David R. Dunn
(74) *Attorney, Agent, or Firm*—Stephen A. Bucchianeri; J. William Stader

(57) ABSTRACT

A skid steer vehicle has a suspension that includes two bogies pivotally connected to the sides of the vehicle and extending fore-and-aft along each side of the vehicle. The bogies are pivotally connected to the vehicle in the middle and have a wheel mounted at each end. A hydraulic motor is coupled to each of the bogies and drives the two wheels on each bogie.

19 Claims, 7 Drawing Sheets

SKID STEER VEHICLE WITH BOGIE SUSPENSION

FIELD OF THE INVENTION

The invention relates generally to skid steer vehicles and, more particularly, it relates to suspensions for such vehicles.

BACKGROUND OF THE INVENTION

Skid steer loaders were first invented about 30 years ago to fill a need for a small highly maneuverable vehicle that was capable of carrying an implement mounted on loader arms. Skid steer loaders are typically small vehicles, on the order of 10 to 14 feet long that rest on four or more wheels, at least two of which being disposed on each side of the vehicle.

In order to turn these vehicles, the wheels on opposing sides of the skid steer loader are driven at different speeds. This causes the faster moving wheels on one side to advance that side over the ground faster than the other side on slower moving wheels. The effect is to turn the vehicle toward the wheels on the slower moving side. Since the wheels are not turnable with respect to the vehicle, the vehicle turns by skidding slightly, hence the name "skid steer loader." In the extreme case the wheels on one side of the vehicle not only rotate slower than the wheels on the other side of the vehicle but can turn in the opposite direction. When this mode of operation is selected, the skid steer loader will rotate in place about a vertical and generally stationary rotational axis.

This ability to change direction by rotating about an axis within the footprint or perimeter of the loader itself was the primary reason why the skid steer loader achieved its great success.

This mode of turning by skidding places large stresses on the axles of the vehicle. This has, until recently, meant that skid steer vehicles do not use suspensions.

Suspensions are generally preferred for skid steer vehicles however, since they permit the vehicle to travel more easily and stably over the rough terrain of many construction sites. This rough terrain is a particular concern for short and narrow wheelbase vehicles like skid steer vehicles. It is an object of this invention to provide such a vehicle.

SUMMARY OF THE INVENTION

In accordance with a first aspect of the invention, a skid steer vehicle is provided that includes a chassis having a right side, a left side, a front end, and a rear end, the chassis defining a lateral axis that extends from the left side to the right side of the chassis parallel to the ground, an internal combustion engine mounted on the chassis, first and second hydraulic pumps coupled to the engine to be driven thereby, a left side suspension including a left side suspension beam having a front end and a rear end and a central portion, wherein the left beam extends fore-and-aft along a left side of the vehicle, and further wherein the left beam is pivotally coupled to the chassis at the central portion thereof to pivot the left beam about the lateral axis with respect to the chassis, a left front wheel coupled to the front end of the left beam at a location forward of the central portion, a left rear wheel coupled to the rear end of the left beam rearward of the central portion, and a first hydraulic motor mounted to the left side suspension beam, wherein the first motor is drivingly coupled to the front wheel and the rear wheel, and a right side suspension including a right side suspension beam having a front end and a rear end and a central portion, wherein the right beam extends fore-and-aft along a right side of the vehicle, and further wherein the right beam is pivotally coupled to the chassis at the central portion thereof to pivot the right beam about the lateral axis with respect to the chassis, a right front wheel coupled to the front end of the right beam at a location forward of the central portion, a right rear wheel coupled to the rear end of the right beam rearward of the central portion, and a second hydraulic motor mounted to the right beam, wherein the second motor is drivingly coupled to the front wheel and the rear wheel.

The first motor may be drivingly coupled to the left front wheel and the left rear wheel to drive the left front and rear wheels in rotation, and the second motor may be coupled to the right front wheel and the right rear wheel to drive the right front and right rear wheels.

The skid steer vehicle may include a first driveshaft coupled to and between the first motor and the left front and left rear wheels, the vehicle may further include a second driveshaft coupled to and between the second motor and the right front and right rear wheels.

The first motor may be fixed to the left beam to pivot therewith and the second motor may be fixed to the right beam to pivot therewith.

The skid steer vehicle may include a first planetary gear set coupled to and between the first motor and the first driveshaft, and may include a second planetary gear set coupled to and between the second motor and the second driveshaft.

The skid steer vehicle may include a left front axle housing fixed to the front end of the left beam, a left rear axle housing fixed to the rear end of the left beam, a right front axle housing fixed to the front end of the right beam, and a right rear axle housing fixed to the rear end of the right beam.

The left front, left rear, right front and right rear axle housings each may have a laterally extending axle, and the laterally extending axles of the left front and left rear axle housing may be drivingly coupled to the first driveshaft and further wherein the laterally extending axles of the right front and right rear axle housings may be drivingly coupled to the second driveshaft.

The first hydraulic pump may be fluidly coupled to the first motor to drive the first motor and the second hydraulic pump may be connected to the second motor to drive the second motor in rotation.

In accordance with a second aspect of the invention, a suspension for a skid steer vehicle is provided, the vehicle having a chassis with left and right sides, a longitudinal axis, a lateral axis, an internal combustion engine and first and second hydraulic pumps coupled to the engine to be driven thereby, the suspension including a first suspension beam having a front end and a rear end and a central portion wherein the first beam is configured to extend fore-and-aft along a first side of the vehicle, and further wherein the first beam is configured to be pivotally coupled to the chassis at the central portion of the first beam to pivot the first beam about the lateral axis with respect to the chassis, a first front wheel coupled to the front end of the first beam at a location forward of the central portion thereof, a first rear wheel coupled to the rear end of the first beam rearward of the central portion, and a first hydraulic motor mounted to the first beam, wherein the first motor is drivingly coupled to the first front wheel and the first rear wheel and is configured to be coupled to and driven by the first hydraulic pump.

The suspension may also include a second suspension beam having a front end and a rear end and a central portion wherein the second beam is configured to extend fore-andaft along a second side of the vehicle opposite the first side of the vehicle, and further wherein the second beam is configured to be pivotally coupled to the chassis at the central portion of the second beam to pivot the second beam about the lateral axis with respect to the chassis, a second front wheel coupled to the front end of the second beam at a location forward of the central portion, a second rear wheel coupled to the rear end of the second beam rearward of the central portion thereof, and a second hydraulic motor mounted to the second beam, wherein the second motor is drivingly coupled to the second front wheel and the second rear wheel and is configured to be coupled to and driven by the second hydraulic pump.

The suspension may also include a first driveshaft extending longitudinally through the first suspension beam from the first front wheel to the first rear wheel, the first driveshaft may be configured to drive both the first front and rear wheels in rotation, and the first driveshaft may be driven by the first hydraulic motor, which is fixed to the central portion of the first beam.

The first motor may be configured to extend inside the chassis.

The suspension may include a first planetary gear set coupled to and between the first motor and the first driveshaft.

The suspension may include a first front axle housing fixed to the front end of the first beam, and a first rear axle housing fixed to the rear end of the first beam.

The first front and first rear axle housings may each include a laterally extending axle, and further wherein each of the laterally extending axles are drivingly coupled to the first driveshaft through a bevel gear set.

The suspension may also include a second driveshaft extending longitudinally through the second suspension beam from the second front wheel to the second rear wheel, wherein the second driveshaft may be configured to drive both the second front and rear wheels in rotation, and further wherein the second driveshaft may be driven by the second hydraulic motor, which may be fixed to the central portion of the second beam.

The first and second motors may be configured to extend inside the chassis.

The suspension may also include first and second planetary gear sets, wherein the first planetary gear set may be coupled to and between the first motor and the first driveshaft, and further wherein the second planetary gear set may be coupled to and between the second motor and the second driveshaft.

The first driveshaft may be an integral member over the entire distance from the first front to the first rear axle housings.

The first and second axle housings and the first suspension beam may not be formed integrally, but may be removably coupled together.

The first and second front wheels may be configured to rotate about a first rotational axis and the first and second rear wheels may be configured to rotate about a second rotational axis when said first and second beams are in a first relative pivotal position.

The first rotational axis, the second rotational axis and the lateral axis may be parallel.

BRIEF DESCRIPTION OF THE FIGURES

Preferred exemplary embodiments of the present invention are illustrated in the accompanying drawings in which like reference numerals represent like parts throughout.

DETAILED DESCRIPTION OF THE INVENTION

Figure 1:
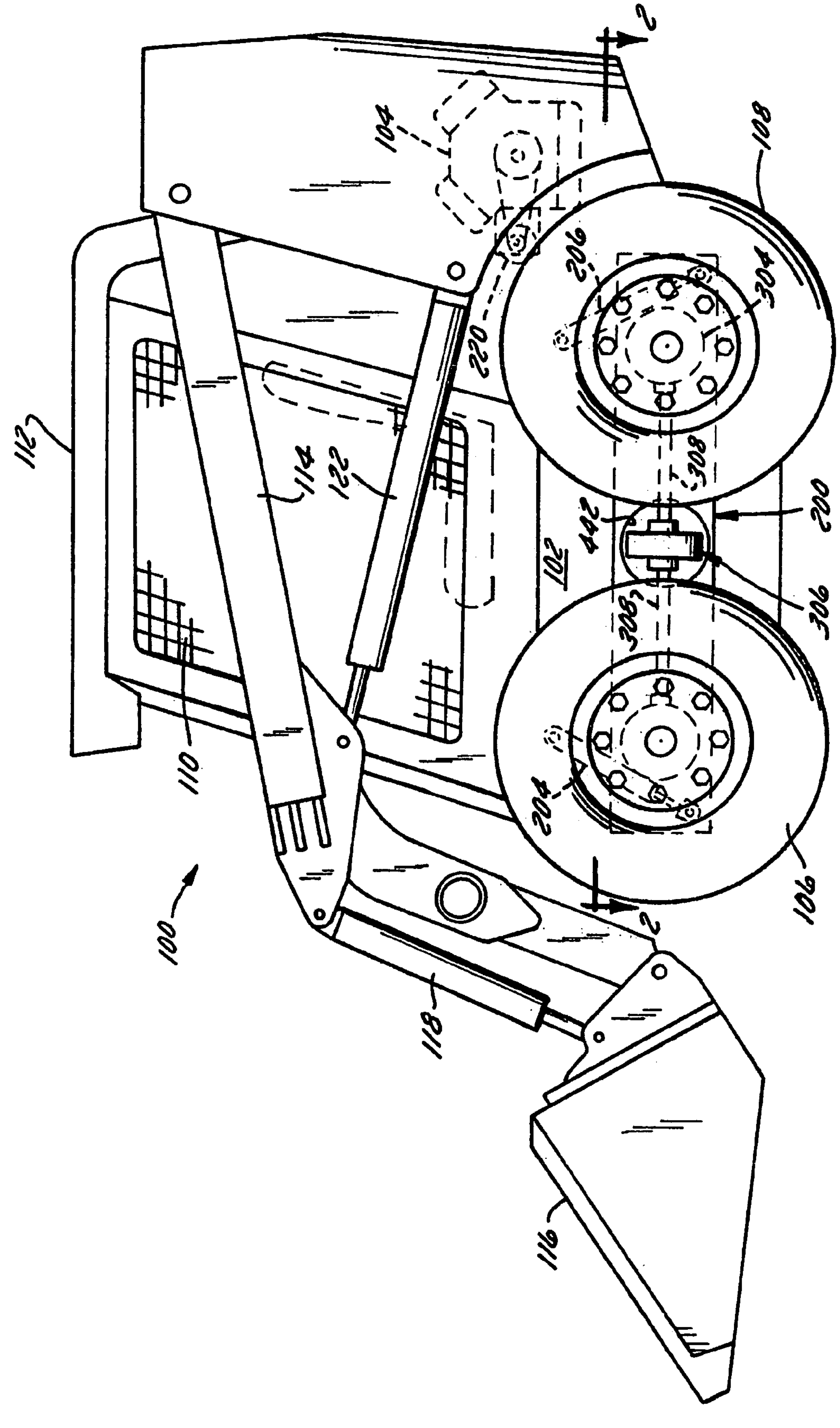
FIG. 1 is a left side view of a skid steer vehicle with a bogie suspension in accordance with the present invention.
Figure 2:
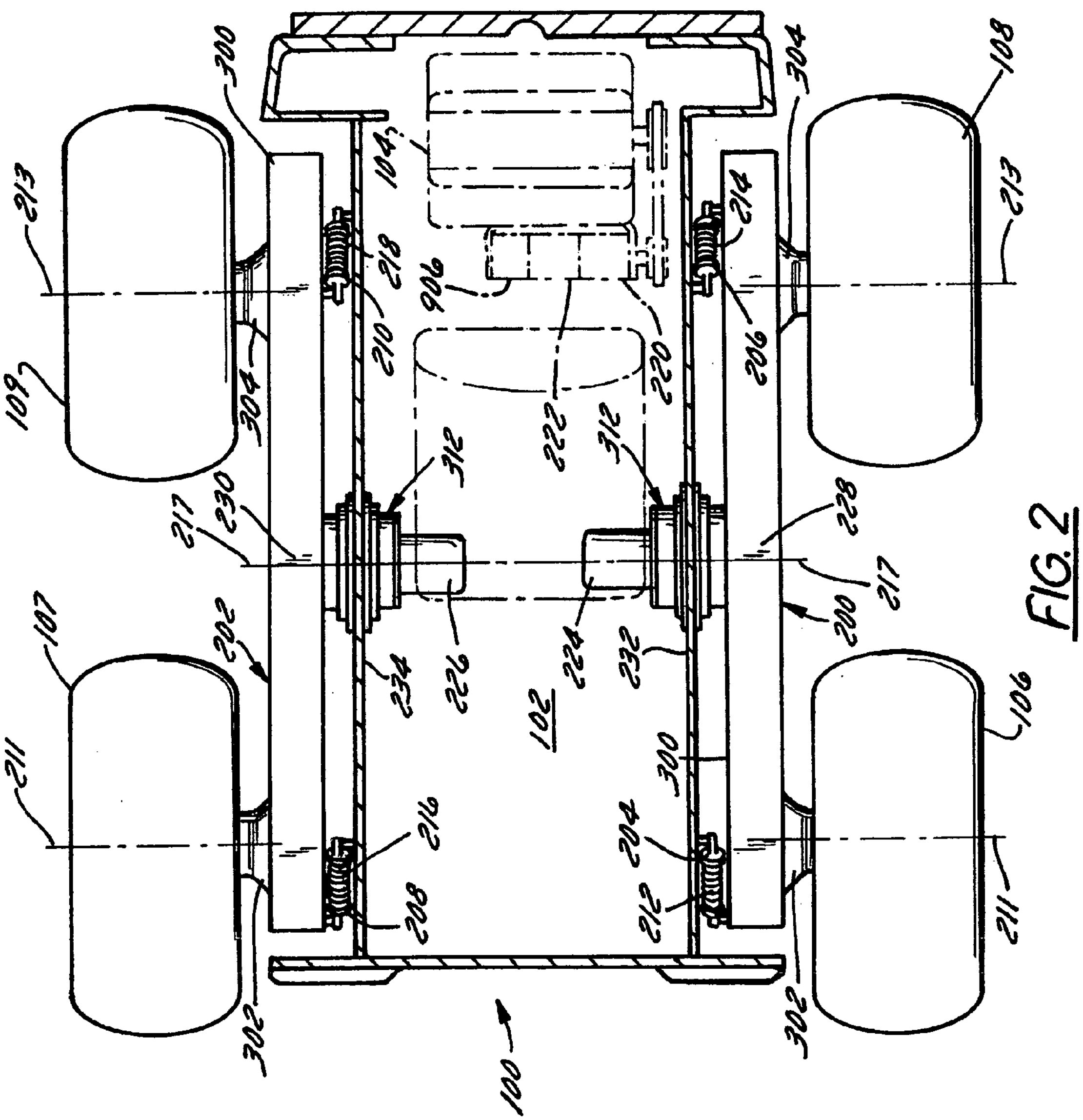
FIG. 2 is a partial cross-sectional plan view of the vehicle of FIG. 1 taken at section line 2—2 in FIG. 1 showing the arrangement of the bogies on either side of the vehicle.

FIGS. 1 and 2 show a skid steer vehicle 100 that has a chassis 102, an engine 104 mounted on the chassis, four wheels including left-side wheels 106, 108 and right-side wheels 107 and 109 (FIG. 2), an operator compartment 110 surrounded by a roll-over protection system 112, a pair of loader lift arms (left-side arm 114 shown in FIG. 1), a loader implement here shown as bucket 116, at least one (and preferably two) bucket cylinder 118, and at least one (and preferably two) loader arm lift cylinder 122.

The wheels 106, 107, 108, and 109 may have solid or pneumatic tires. The wheels need not contact the ground directly, but may be wrapped by continuous belts or tracks (not shown). One of these tracks may extend around wheels 106 and 108 on one side of the vehicle and be driven thereby. The other track may extend around wheels 107 and 109 on the other side of the vehicle and be driven thereby.

The operator compartment 110 is preferably defined by a cage, having a plate for a roof and expanded metal mesh on its rear, left and right sides. The front of the compartment is preferably open to permit the operator easy entry and egress.

The chassis is preferably formed of several steel sheets that are welded or bolted together to form a bucket having four sidewalls, a floor pan and an open top in which the engine, hydraulic drive pumps and drive motors are mounted.

Engine 104 is coupled to and drives several hydraulic drive pumps (FIGS. 2 and 9) that provide hydraulic fluid under pressure. This fluid is used to drive the vehicle over the ground and to operate the hydraulic cylinders. The hydraulic cylinders, in turn, raise and lower the loader arms and tilt the bucket. Details of the hydraulic circuit that drives the wheels in rotation can be found in FIG. 9 and described in the accompanying text.

FIG. 2 is a plan view of the chassis in partial cross-section, the section being taken at Section line 2—2 in FIG. 1. FIG. 2 illustrates the arrangement of the vehicle suspension system and the wheels in relation to the vehicle's chassis, engine and hydraulic drive pumps.

The vehicle suspension includes bogies 200 and 202, hydraulic suspension cylinders 204, 206, 208, and 210, and associated springs 212, 214, 216, and 218. Each bogie 200,202 has two wheels mounted thereon to support and drive the vehicle over the ground. The middle of each bogie is pivotally connected to the chassis to permit the bogie to pivot up and down with respect to the chassis. Each bogie pivots about a pivotal axis 217 that is generally horizontal. This horizontal axis is at a right angle to the longitudinal fore-and-aft axis of the vehicle. This pivotal axis 217 is also parallel to the axis of rotation of the wheels mounted thereon.

In the preferred embodiment, shown here, both of the bogies 200 and 202 share the same pivotal axis 217, the length of the bogies is the same and the location of the wheels on each bogie is the same. Thus, not only do the bogies share the same pivotal axis, but the wheels share the same rotational axis. Both left front wheel 106 and right front wheel 107 rotate about the same rotational axis 211 when bogies 200 and 202 are in the same pivotal position with respect to the vehicle. Similarly, both left rear wheel 108 and right rear wheel 109 rotate about a common rotational axis 213 when the bogies are in the same pivotal position.

In the preferred embodiment there are four hydraulic suspension cylinders 204, 206, 208 and 210 that are coupled to the bogies and to the vehicle chassis. In the preferred embodiment these cylinders damp the pivotal motion of the bogies with respect to the chassis.

Cylinder 204 is coupled to the front end of bogie 200 and to the chassis. Cylinder 206 is coupled to the rear end of bogie 200 and to the chassis. Cylinder 208 is coupled to the front end of bogie 202 and the chassis. Cylinder 210 is coupled to the rear end of bogie 202 and the chassis. When the bogies pivot with respect to the vehicle chassis, the cylinders are alternatively compressed and extended. As they are extended and compressed an internal piston moves up and down in the cylinder. The cylinders damp movement of the bogie by restricting the flow of hydraulic fluid from one side of the moving piston to the other. The restriction is preferably variable, either manually or electronically, to permit the operator to adjust the motion of the vehicle to the terrain.

Four springs 212, 214, 216, and 218 are also provided to control the pivotal motion of the bogies with respect to the vehicle's chassis. In the embodiment of FIGS. 1–2, the springs are coil-over springs that are coiled around each of the cylinders. The springs are compressed and extended with their associated cylinders when the bogies pivot with respect to the vehicle just like the hydraulic cylinders that they surround.

In the illustrated embodiment, each end of both bogies has an associated spring and cylinder to provide springing and damping. In an alternative arrangement, a spring and a cylinder may be removed from each bogie, thus providing one spring and one cylinder for each bogie. The remaining spring and cylinder may be arranged as a single cylinder with a coil-over spring, at either the front or the rear of the bogie. The remaining spring and cylinder may also be arranged as two units, a spring unit and a cylinder unit, the spring unit being attached to one end of the bogie and the cylinder being attached to the opposing end of the bogie.

In yet another alternative arrangement, the coil spring may be replaced by a cylinder that includes a pressurized gas. In such a system, springing is provided by applying the pressurized gas to the cylinder either by charging the cylinder with gas or by connecting the cylinder to a remote source of pressurized gas.

In yet another arrangement, in any of the configurations above, one or more of the springs and one or more of the cylinders can be replaced with one or more gas-charged cylinders that functions both as a spring and a damper.

FIG. 2 also illustrates hydraulic drive pumps 220 and 222. These pumps are fluidly coupled to and drive hydraulic motors 224 and 226. Hydraulic motors 224 and 226 are mounted on bogies 200 and 202.

Hydraulic drive motors 224 and 226 are fixed to central pivoting portions 228, 230 of bogies 200, 202, respectively, to pivot with bogies 200, 202 when bogies 200, 202 pivot with respect to chassis 102. When motors 224, 226 rotate, their power is conducted through sidewalls 232, 234 of the chassis, then into the central pivoting portions 228, 230 of bogies 200, 202, then into elongate beam portions of bogies 200, 202, respectively, where the power is split. The power is then conducted forward to the front wheel and backward to the rear wheel, which are driven in rotation.

Figure 3:
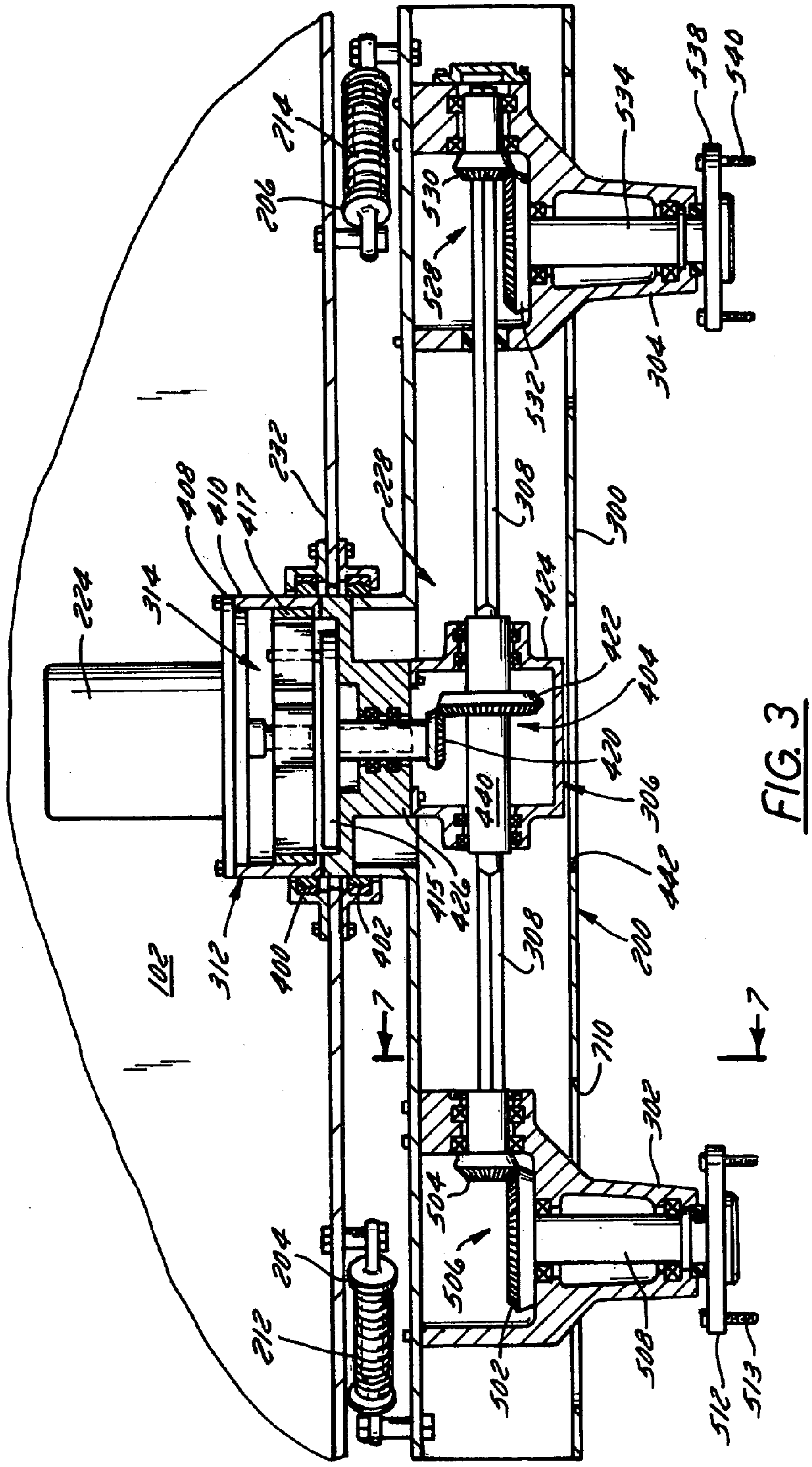
FIG. 3 is a cross-sectional plan view of the left side bogie of FIGS. 1 and 2 showing the general arrangement of gears, driveshaft, and hydraulic motor that are collectively used to drive the left side wheels.

This power transfer from the motor to the wheels is better illustrated by reference to FIG. 3, a cross-sectional plan view of bogie 200. Bogie 200 includes an elongate beam portion 300, a front axle housing 302 and a rear axle housing 304 coupled to the beam, a central gearbox 306 disposed between the front and rear axle housings, a driveshaft 308 (coupled to and between the axle housings and the central gearbox to drive the axle housings), and a motor gearbox 312 that includes a planetary gear set 314.

Power is conducted from the motor 224 to the planetary gear set 314. The output of the planetary gear set 314 is coupled to and drives the central gearbox 306. The output of central gearbox 306 is coupled to and drives driveshaft 308. Driveshaft 308 is coupled to and drives the front axle housing 302 and the rear axle housing 304. The front and rear axle housings drive front and rear axles, which are coupled to and drive the vehicle's wheels.

Bogie 200 is shown in greater detail with regard to FIGS. 4–6, below. While bogie 200 is illustrated in FIG. 3, bogie 202 is an identical mirror image of the bogie 200, and thus all the explanations that are made herein regarding bogie 200 are equally applicable to bogie 202.

Figure 4:
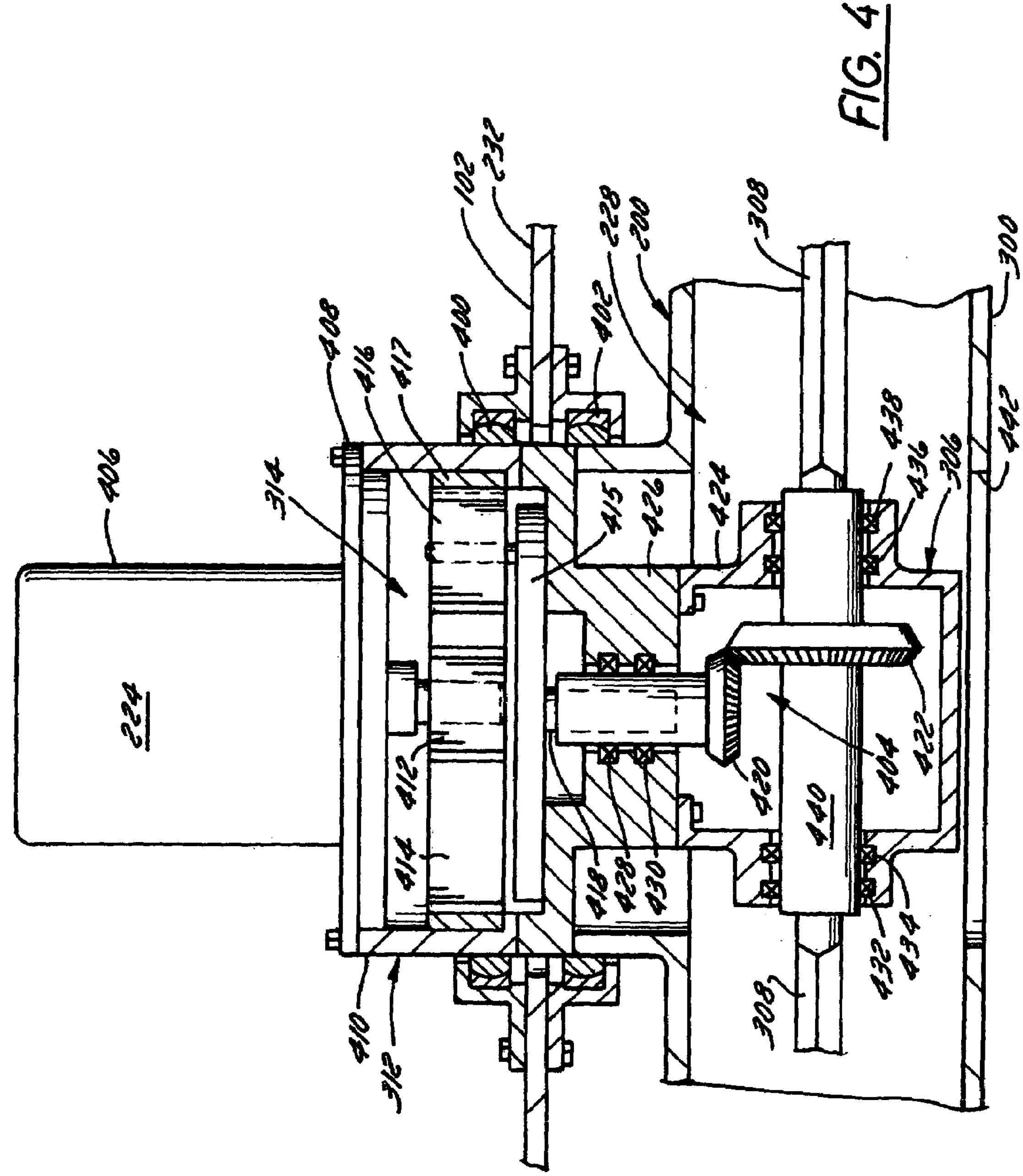
FIG. 4 is a fragmentary cross-sectional plan view of the central pivot region of the left side bogie of the foregoing FIGURES.

FIG. 4 is a fragmentary cross-sectional view of the central portion of beam 300 showing the pivot bearings 400 and 402 that pivotally support the bogie 200, planetary gear set 314, and bevel gear set 404 of central gearbox 306.

Motor 224 has a motor body 406 that is fixed to an outwardly extending motor flange 408. The circular outer periphery of flange 408 is bolted to the circular shell 410 of motor gearbox 312 thereby mounting the motor body to the motor gearbox. Motor gearbox 312 encloses planetary gear set 314, which includes planetary sun gear 412, three planet gears including illustrated planet gears 414 and 416 (the unnumbered third planet gear cannot be seen in FIG. 4), and ring gear 417. Ring gear 417 is fixed to the inner wall of shell 410 and does not rotate.

A planetary gear spider 415 is coupled to and supports the three planet gears, transmitting their power to a planet gear output shaft 418 to which spider 415 is fixed. Output shaft 418 is coupled to and drives bevel gear 420 of central gearbox 306. Gear 420, in turn, is engaged to and drives bevel gear 422 of central gearbox 306. Gearbox 306 includes mating bevel gears 420, 422 and housing 424, which is fixed to gear support 426.

Gear support 426 forms one end of motor gearbox 312 and forms a support or base for central gear box 306.

Support 426 includes two bearings 428 and 430 that support bevel gear 420 for rotation when it is driven by planetary gear output shaft 418.

Housing 424 includes two pairs of bearings 432, 434 and 436, 438 that support shaft 440 at its first end and at its second end, respectively. Shaft 440 also engages and drives driveshaft 308, which extends forward from housing 424 to front axle housing 302, which it drives, and it extends rearward to rear axle housing 304 which it also drives. Support shaft 440 is fixed to and driven in rotation by gear 422.

In the embodiment shown in FIG. 4, an aperture 442 is provided in bogie beam 300, which, as shown in FIG. 4, is in the form of an elongate rectangular box. A longitudinal cross-sectional view of rectangular box bogie beam 300 can be seen in FIG. 7. See the discussion accompanying FIGS. 7 and 8, below, for alternative constructions of beam 300.

Figure 6:
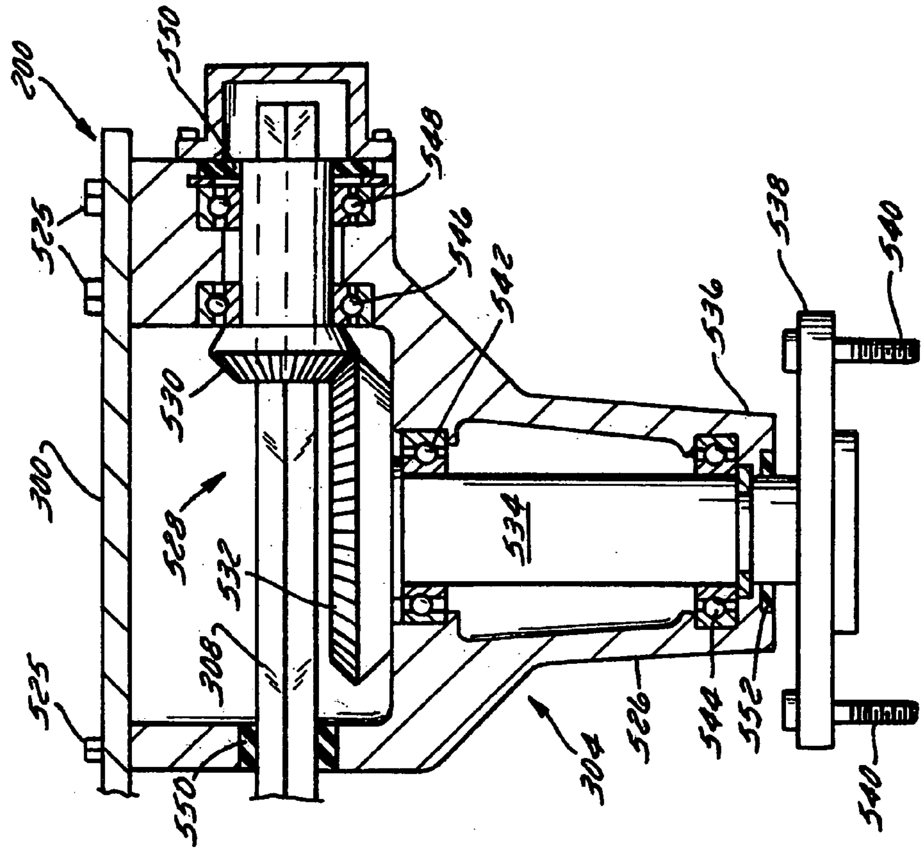
FIGS. 5 and 6 are fragmentary cross-sectional views of the front and rear ends of the left side bogie of the foregoing FIGURES.
Figure 5:
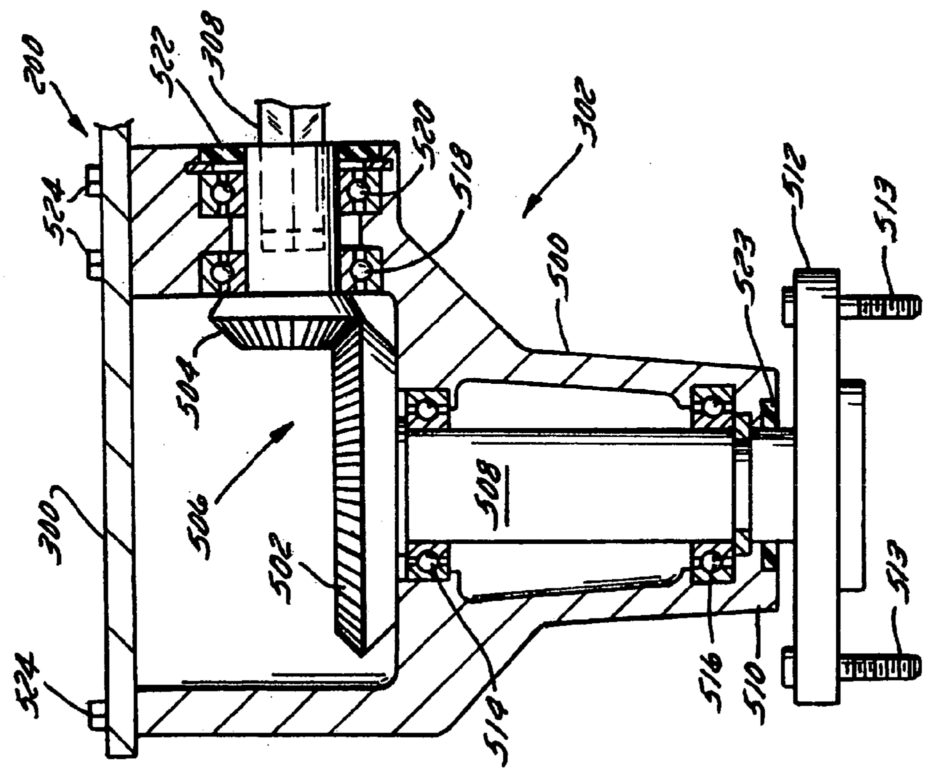

FIGS. 5 and 6 show the front and the rear axle housings of bogie 200 in greater detail. Front axle housing 302 includes a body or shell 500 that encloses a bevel gear set 506. Gear set 506 includes a pinion bevel gear 504 and a bull bevel gear 502 to which it is drivingly engaged. The bull bevel gear 502 is fixed to axle 508. Axle 508 extends outward, penetrating the conical outer end 510 of the shell 500 and terminating in a flange 512. Wheel 106 (not shown) is fixed to flange 512 and rotates with axle 508. Several bolts 513 extend outward from flange 512 through wheel 106 (not shown) to fix the wheel to flange 512.

Two pairs of bearings 514, 516, and 518, 520 are provided in shell 500 to support axle 508 and bevel gear 504, respectively, for rotation. A seal 522 extends between gear 504 and shell 500 to seal the interior of shell 500, thereby reducing fluid leakage from the shell. A similar seal 523 is provided between axle 508 and shell 500 to seal the interior of the shell, thereby reducing leakage from the shell. The shell itself is preferably filled with gear lube to lubricate the interengaging surfaces of the internal gears and the bearings.

Bevel gear 504 has an internal faceted recess, shown here as a square or hexagonal hole, that receives driveshaft 308. When driveshaft 308 is driven in rotation by motor 224, it drives bevel gear 504 in rotation, which drives bull gear 502 in rotation, which in turn drives axle 508 in rotation. Axle 508 is fixed to wheel 106 and drives wheel 106 in rotation. Thus, motor 224 drives wheel 106 in rotation. Shell 500 is fixed to beam 300 by several bolts 524. These bolts extend through beam 300 and are threadedly engaged to shell 500.

FIG. 6 shows the rear axle housing 304 of bogie 200. It includes a body or shell 526 that encloses bevel gear set 528. Gear set 528 includes a pinion bevel gear 530 and a bull bevel gear 532 to which the pinion 530 is drivingly engaged. Bull bevel gear 532 is fixed to axle 534. Axle 534 extends outward, penetrating the conical outer end 536 of the shell 526 and terminating in a flange 538. Wheel 108 (not shown) is fixed to flange 538 and rotates with axle 534. Several bolts 540 extend outward from flange 538 through wheel 108 to fix the wheel to flange 538.

Two pairs of bearings 542, 544, and 546, 548 are provided in shell 526 to support axle 534 and bevel gear 530, respectively, for rotation. A seal 550 extends between gear 530 and shell 526 to seal the interior of shell 526, thereby reducing fluid leakage from the shell. A similar seal 552 is provided between axle 534 and shell 526 to seal the interior of shell, thereby reducing leakage from the shell. The shell itself is preferably filled with gear lube to lubricate the interengaging surfaces of the internal gears and the bearings.

Bevel gear 530 has an internal faceted recess, shown here as a square or hexagonal hole, that receives an end of driveshaft 308. Driveshaft 308 is similarly configured to engage the inner surfaces of the hole and rotate the bevel gear when the driveshaft is itself driven in rotation. When driveshaft 308 is driven by motor 224, it drives bevel gear 530 in rotation, which drives bevel gear 532 in rotation, which in turn drives axle 534 in rotation. Axle 534 is fixed to wheel 108 and drives wheel 108 in rotation. Shell 526 is fixed to beam 300 by several bolts 525. These bolts extend through beam 300 and are threadedly engaged to shell 526.

Figure 7:
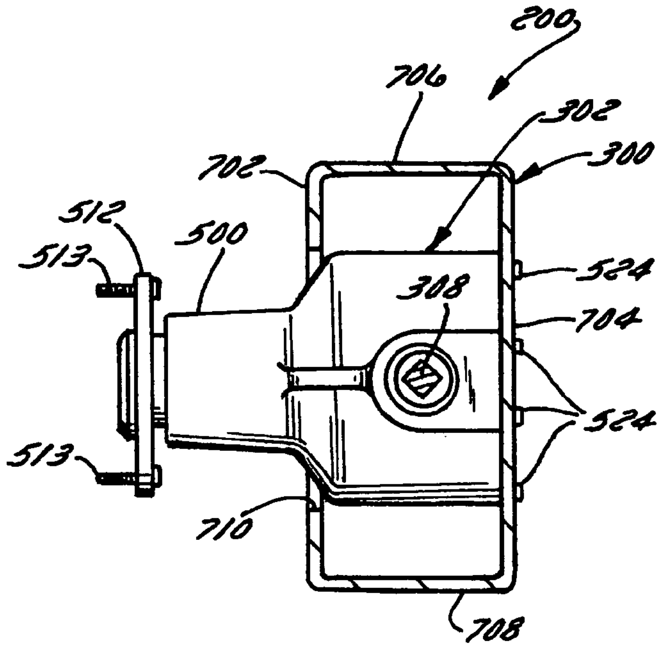
FIGS. 7 and 8 are cross sections of the left side bogie suspension perpendicular to a longitudinal axis of the vehicle taken at section line 7—7 in FIG. 3 showing alternative bogie beam arrangements, FIG. 7 illustrating a rectangular box-beam arrangement and FIG. 8 illustrating a "C"-beam arrangement.

FIG. 7 shows the cross-section of bogie 200 in a preferred embodiment. The cross section of bogie 200 shows a preferred box shape of beam 300. Beam 300 is in the form of a rectangular box-shaped channel made of four substantially flat plates 702, 704, 706, and 708 joined at their edges to form the rectangular configuration of the beam. Two of these plates, 702, 704 are oriented generally vertically and extend fore-and-aft along the left-hand side of the vehicle's chassis. The other two plates 706, 708 are oriented generally horizontally and parallel to the ground and also extend fore-and-aft along the left side of the vehicle.

In a preferred embodiment, the beam is integrally formed into rectangular stock, such as by rolling in a mill. The rectangular box bar stock formed by rolling is later formed into beam 300 by cutting it to length and forming openings including aperture 710 and the holes that receive bolts 524.

Aperture 710 is formed in outer plate 702 to receive axle housing 302. Housing 302 is inserted into this aperture and is bolted to the inside surface of plate 704 by bolts 524 passing through bolt-receiving apertures formed in plate 704. Similar housing and bolt receiving apertures are formed in the rear end of the beam 300 to receive the ear axle housing 304 and bolts 525.

Figure 8:
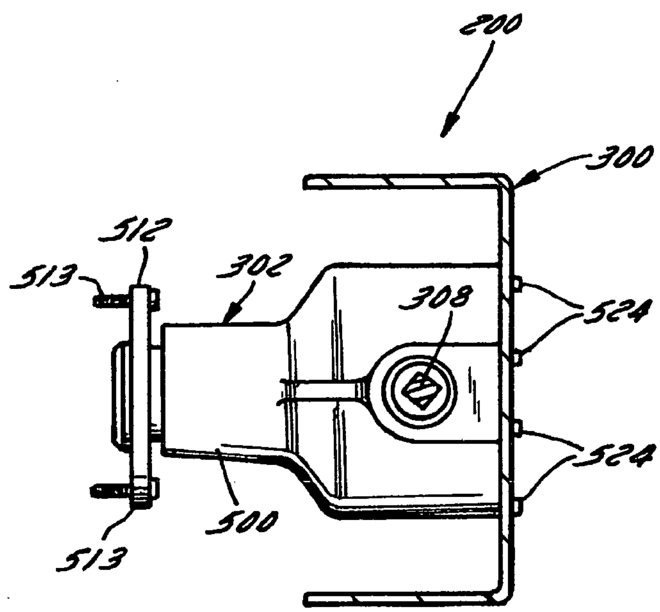

FIG. 8 illustrates an alternative configuration for beam 300 of FIG. 7. Alternate beam 300 of FIG. 8 is shown as an elongate member with a "C"-shaped cross-section as opposed to the rectangular box cross-section of beam 300 of FIG. 7.

The two configurations of FIGS. 7 and 8 are preferred for low quantity production run vehicles. By removably coupling the axle housings 302, 304 to the beam with bolts the vehicle can be more easily maintained and can be manufactured at lower cost.

If skid steer vehicles are manufactured in larger quantities, however, a preferred configuration is to configure beam 300 as a single or multi-piece casting. In this arrangement the axle housing shells 500, 526 as well as the beam 300 could be formed integrally. For example, they could be cast as a single unit, a single elongated casting. In this configuration, bearing seats and seal seats are machined directly into the single casting and the gears are mounted directly therein.

Alternatively, beam 300 may be formed as a single casting with the two axle housings (preferably also formed by casting) separately manufactured and subsequently affixed to beam 300.

Figure 9:
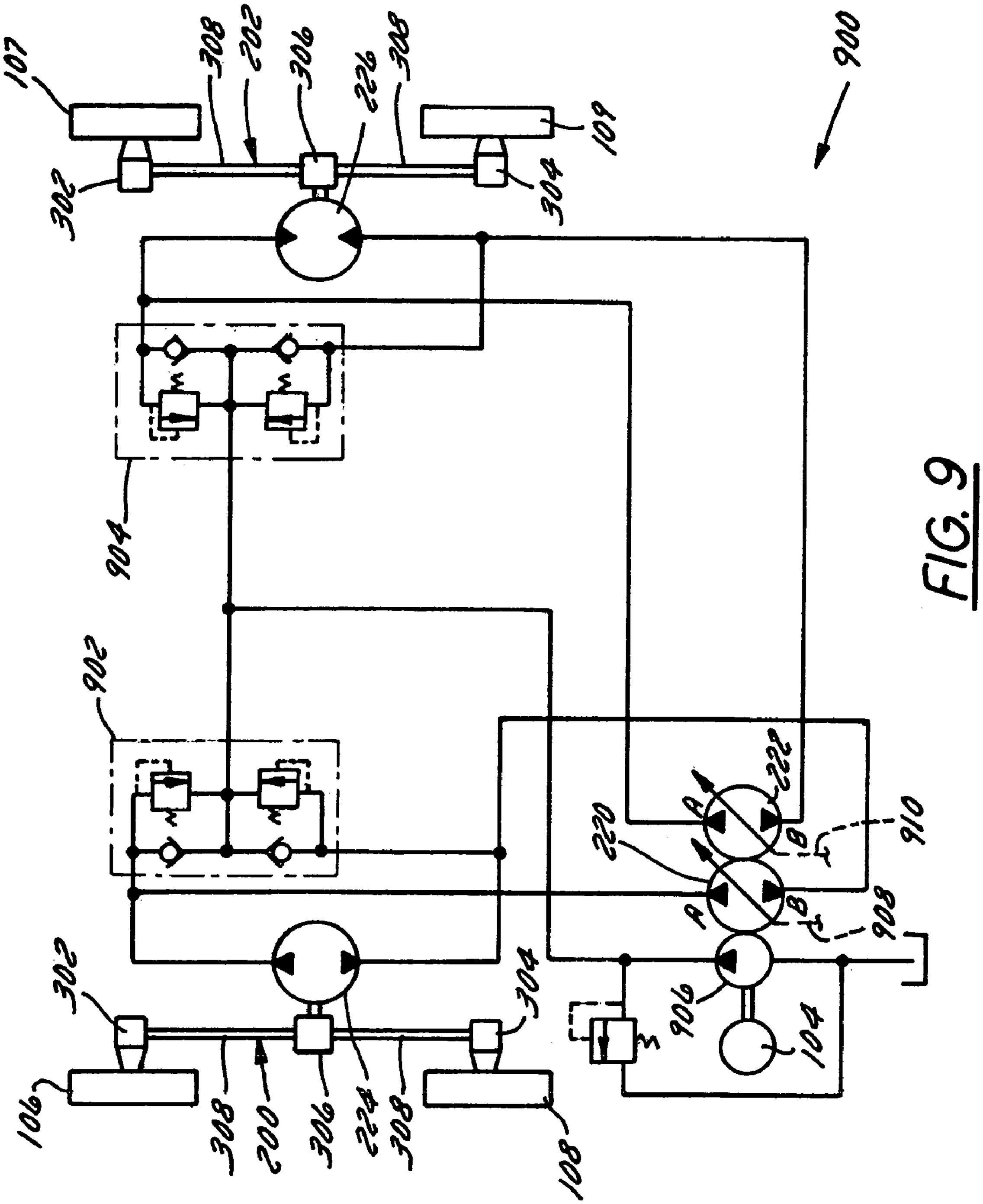
FIG. 9 is a hydraulic schematic of the hydraulic drive system for the vehicle of the foregoing FIGURES showing the two parallel and interdependently controllable hydraulic drive circuits, one for the left side wheels and one for the right side wheels.

FIG. 9 illustrates a preferred hydraulic drive system 900 that is coupled to bogies 200 and 202 to drive them (and the chassis they support) over the ground. Drive system 900 includes hydraulic pumps 220 and 222, hydraulic motors 224 and 226, hydraulic fluid pressure relief and makeup circuits 902 and 904, and hydraulic fluid makeup pump 906.

Hydraulic pump 220 is coupled to hydraulic motor 224 in a series circuit. Relief circuit 902 is coupled to and across both pump 220 and motor 224. In a similar fashion, hydraulic pump 222 is coupled to hydraulic motor 226 in a series circuit Relief circuit 904 is coupled to and across both pump 222 and motor 226. Makeup pump 906 is coupled to both relief circuit 902 and relief circuit 904.

Pumps 220 and 222 are variable displacement pumps. The specific displacement of both pumps can be changed to provide for flow in both directions through the pump: from a first port "A" to a second port "B", and from the second port "B" back to the first port "A".

Pump displacement is preferably controlled manually by mechanical actuators or by electronic actuators under computer control.

The pumps' flow rates and flow direction can be controlled independently of one another. This is indicated by the separate signal lines 908 and 910 that are coupled to and extend from their respective pumps.

Motors 224 and 226 are preferably fixed displacement motors that rotate through a predetermined angle in response to a given volume of hydraulic fluid passing therethrough. Each motor is mechanically coupled to its corresponding wheels to drive those wheels in rotation by mechanical interconnections described above in conjunction with FIGS. 2–6. Motor 224 is coupled to and drives wheels 106 and 108, and motor 226 is coupled to and drives wheels 107 and 109.

While the embodiments illustrated in the FIGURES and described above are presently preferred, it should be understood that these embodiments are offered by way of example only. The invention is not intended to be limited to any particular embodiment, but is intended to extend to various modifications that nevertheless fall within the scope of the appended claims.

The invention claimed is:

1. A skid steer vehicle comprising:

a chassis having a right side, a left side, a front end, and a rear end, said chassis defining a lateral axis that extends from the left side to the right side of the chassis parallel to the ground;

an internal combustion engine mounted on the chassis;

first and second hydraulic pumps coupled to the engine to be driven thereby;

a left side suspension including a left side suspension beam having a front end and a rear end and a central portion, wherein said left beam extends fore-and-aft along a left side of the vehicle, and further wherein said left beam is pivotally coupled to the chassis at said central portion thereof to pivot said left beam about said lateral axis with respect to said chassis, a left front wheel coupled to the front end of the left beam at a location forward of the central portion, a left wheel coupled to the rear end of the left beam rearward of the central portion, and a first hydraulic motor mounted to the left side suspension beam, wherein said first motor is drivingly coupled to the front wheel and the rear wheel; and a right side suspension including a right side suspension beam having a front end and a rear end and a central portion, wherein said right beam extends fore-and-aft along a right side of the vehicle, and further wherein said right beam is pivotally coupled to the chassis at said central portion thereof to pivot said right beam about said lateral axis with respect to said chassis, a right front wheel coupled to the front end of the right beam at a location forward of the central portion, a right rear wheel coupled to the rear end of the right beam rearward of the central portion, and a second hydraulic motor mounted to the right beam, wherein said second motor is drivingly coupled to the front wheel and the rear wheel, wherein the first motor is fixed to the left beam to pivot therewith and wherein the second motor is fixed to the right beam to pivot therewith.

2. The skid steer vehicle of claim 1, further comprising a first planetary gear set coupled to and between the first motor and the first driveshaft, and comprising a second planetary gear set coupled to and between the second motor and the second driveshaft.

3. The skid steer vehicle of claim 2, further comprising a left front axle housing fixed to the front end of the left beam, a rear left axle housing fixed to the rear end of the left beam, a right front axle housing fixed to the front end of the right beam, and a right rear axle housing fixed to the rear end of the right beam.

4. The skid steer vehicle of claim 3, wherein the left front, left rear, right front and right rear axle housings each include a include a laterally extending axle, and further wherein the laterally extending axles of the left front and left rear axle housing are drivingly coupled to the first driveshaft, and further wherein the laterally extending axles of the right front and right rear axle housings are drivingly coupled to the second driveshaft.

5. The skid steer vehicle of claim 1, wherein the first hydraulic pump is fluidly coupled to the first motor to drive the first motor, and the second hydraulic pump is connected to the second motor to drive the second motor in rotation.

6. A suspension for a skid steer vehicle, said vehicle having a chassis with left and right sides, a longitudinal axis, a lateral axis, an internal combustion engine and first and second hydraulic pumps coupled to the engine to be driven thereby, the suspension comprising:

a first suspension beam having a front end and a rear end and a central portion wherein said first beam is configured to extend fore-and-aft along a first side of the vehicle, and further wherein said first beam is configured to be pivotally coupled to the chassis at said central portion of said first beam to pivot said first beam about said lateral axis with respect to said chassis;

a first front wheel coupled to the front end of the first beam at a location forward of the central portion thereof;

a first rear wheel coupled to the rear end of the first beam rearward of the central portion; and a first hydraulic motor fixed to the first beam to pivot therewith, wherein said first motor is drivingly coupled to the first front wheel and the first rear wheel and is configured to be coupled to and driven by the first hydraulic pump.

7. The suspension of claim 6, further comprising:

a second suspension beam having a front end and a rear end and a central portion wherein said second beam is configured to extend fore-and-aft along a second side of the vehicle opposite the first aide of the vehicle, and further wherein said second beam is configured to be pivotally coupled to the chassis at said central portion of said second beam to pivot said second beam about said lateral axis with respect to said chassis;

a second front wheel coupled to the front end of the second beam at a location forward of the central portion;

a second rear wheel coupled to the rear end of the second beam rearward of the central portion thereof; and a second hydraulic motor fixed to the second beam to pivot therewith, wherein said second motor is drivingly coupled to the second front wheel and the second rear wheel and is configured to be coupled to and driven by the second hydraulic pump.

8. The suspension of claim 7, wherein the first and second front wheels are configured to rotate about a first rotational axis and said first and second rear wheels are configured to rotate about a second rotational axis when said first and second beams are in a first relative pivotal position.

9. The suspension of claim 8, wherein the first rotational axis, the second rotational axis and the lateral axis are parallel.

10. The suspension of claim 6, further comprising:

a first driveshaft extending longitudinally through the first suspension beam from the first front wheel to the first rear wheel, wherein the first driveshaft is configured to drive both the first front and rear wheels on rotation, and further wherein the first driveshaft is driven by the first hydraulic motor, which is fixed to the central portion of the first beam.

11. The suspension of claim 10, wherein the first motor is configured to extend inside said chassis.

12. The suspension of claim 11, further comprising a first planetary gear set coupled to and between the first motor and the first driveshaft.

13. The suspension of claim 12, further comprising a first front axle housing fixed to the front end of the first beam, and a first rear axle housing fixed to the rear end of the first beam.

14. The suspension of claim 13, wherein the first front and first rear axle housings each include a laterally extending axle, and further wherein each of said laterally extending axles are drivingly coupled to the first driveshaft through a bevel gear set.

15. The suspension of claim 14, wherein the first driveshaft is an integral member over the entire distance from the first front to the first rear axle housings.

16. The suspension of claim 14, wherein the first and second axle housings and the first suspension beam are not formed integrally, but are removably coupled together.

17. A suspension for a skid steer vehicle, said vehicle having a chassis with left and right sides, a longitudinal axis, a lateral axis, an internal combustion engine and first and second hydraulic pumps coupled to the engine to be driven thereby, the suspension comprising:

a first suspension beam having a front end and a rear end and a central portion wherein said first beam is configured to extend fore-and-aft along a first side of the vehicle, and further wherein said first beam is configured to be pivotally coupled to the chassis said central portion of said first beam to pivot said first beam about said lateral axis with respect to said chassis;

a first front wheel coupled to the front end of the first beam at a location forward of the central portion thereof;

a first rear wheel coupled to the rear end of the first begin rearward of the central portion, a first hydraulic motor fixed to the first beam to pivot therewith, wherein said first motor is drivingly coupled to the first front wheel and the first rear wheel and is configured to be coupled to and driven by the first hydraulic pump;

a first driveshaft extending longitudinally through the first suspension beam from the first front wheel to the first rear wheel, wherein the first driveshaft is configured to drive both the first front and rear wheels on rotation, and further wherein the first driveshaft is driven by the first hydraulic motor, which is fixed to the central portion of the first beam;

a second suspension beam having a front end and a rear end and a central portion wherein said second beam is configured to extend fore-and-aft along a second side of the vehicle opposite the first side of the vehicles, and further wherein said second beam is configured to be pivotally coupled to the chassis at said central portion of said second beam to pivot said second beam about said lateral axis with respect to said chassis;

a second front wheel coupled to the front end of the second beam at a location forward of the central portion;

a second rear wheel coupled to the rear end of the second beam rearward of the central portion thereof;

a second hydraulic motor fixed to the second beam to pivot therewith, wherein said second motor is drivingly coupled to the second front wheel and the second rear wheel and is configured to be coupled to and driven by the second hydraulic pump; and a second driveshaft extending longitudinally through the second suspension beam from the second front wheel to the second rear wheel, wherein the second driveshaft is configured to drive both the second front and rear wheels in rotation, and further wherein the second driveshaft is driven by the second hydraulic motor, which is fixed to the central portion of the second beam.

18. The suspension of claim 17, wherein the first and second motors are configured to extend inside the chassis.

19. The suspension of claim 18, further comprising first and second planetary gear sets, wherein the first planetary gear set is coupled to and between the first motor and the first driveshaft, and further wherein the second planetary gear set is coupled to and between the second motor and the second driveshaft.

* * * * *